No. 883,751. PATENTED APR. 7, 1908.
R. SCHÜTTAUF.
DEVICE FOR CLOSING PLATE OR FILM HOLDERS.
APPLICATION FILED JUNE 23, 1906.

UNITED STATES PATENT OFFICE.

RICHARD SCHÜTTAUF, OF JENA, GERMANY, ASSIGNOR TO THE FIRM OF CARL ZEISS, OF JENA, GERMANY.

DEVICE FOR CLOSING PLATE OR FILM HOLDERS.

No. 883,751.  Specification of Letters Patent.  Patented April 7, 1908.

Application filed June 23, 1906. Serial No. 323,003.

*To all whom it may concern:*

Be it known that I, RICHARD SCHÜTTAUF, mathematician, a citizen of the German Empire, and residing at Carl-Zeiss strasse, Jena, in the Grand Duchy of Saxe-Weimar, Germany, have invented a new and useful Device for Closing Plate or Film Holders, of which the following is a specification.

The invention relates to plate or film holders, in which the shutter—like a paper bag in form—envelops the support of the photographic sensitive surface or its carrier, but with its open end being received into a collar so as to be closed, and in whose production flexible materials are employed, either for the shutter, (British Patent No. 1109 of 1901), for the collar or for both. In film holders of this kind the open end of the shutter or of the collar or both may present slight irregularities, rendering the introduction of the shutter into the collar difficult when closing the film holder after loading or after exposure. To facilitate this introduction, to make it certain of execution that every attempt succeeds is the aim of the present invention. The solution of the difficulty, which arises here, consists in introducing into the collar an insertion piece of stiff material shaped to present an outer guide for the shutter. In double film holders, and in such single film holders whose support of the sensitive surface is not protected by means of a carrier against the admission of light from behind, such insertion piece must be introduced into the collar not only at the front of the film holder but also at the obverse side because in these cases the back wall of the shutter in its whole width must also enter into the collar. A thin tongue is suitably chosen as the insertion piece—in the latter above mentioned cases therefore two of them, one in front of, and one behind, the shutter, and the two pieces can also be connected to form an embrasure. In order that the advantage of the invention may extend also to the closing of the film holder after the exposure, such insertion piece must be applied in the entrance slit of the camera attachment receiving the film holder. Then the insertion piece duly takes up its position in the collar when the film holder is pushed home into the attachemnt, so that it serves as a guide for the shutter when the film holder is closed after an exposure.

Figure 1:
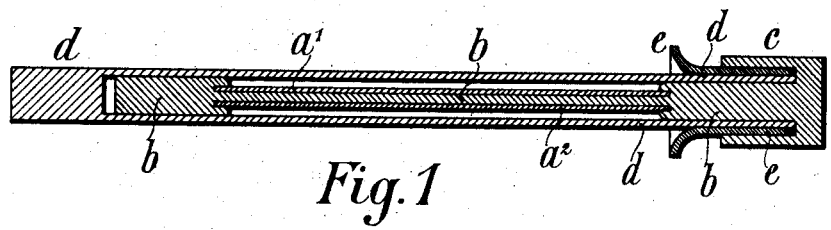
Figure 2:
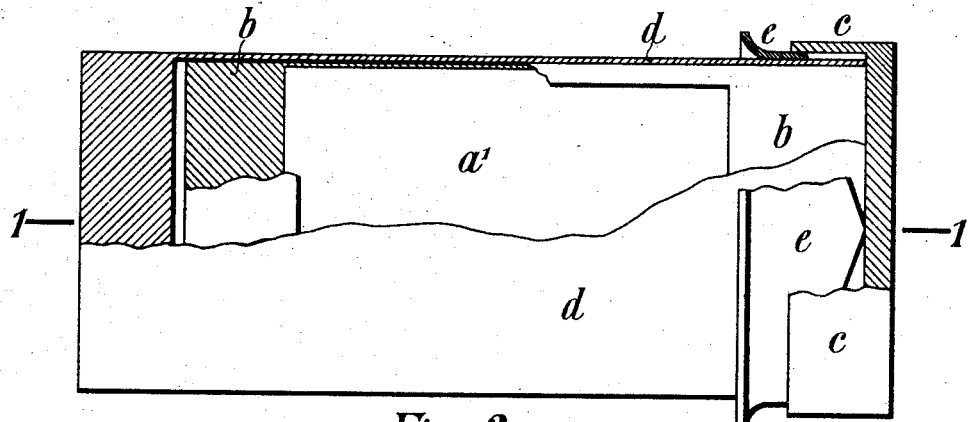
Figure 3:
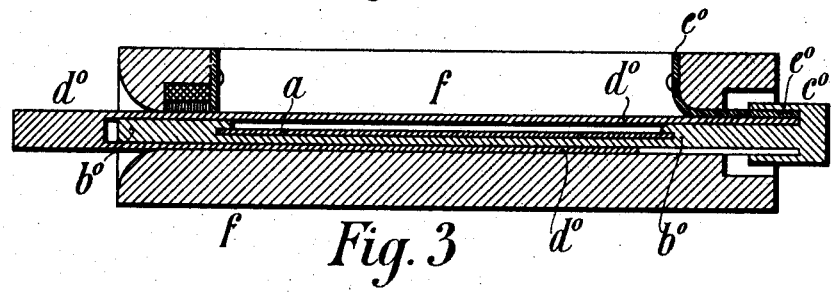
Figure 4:
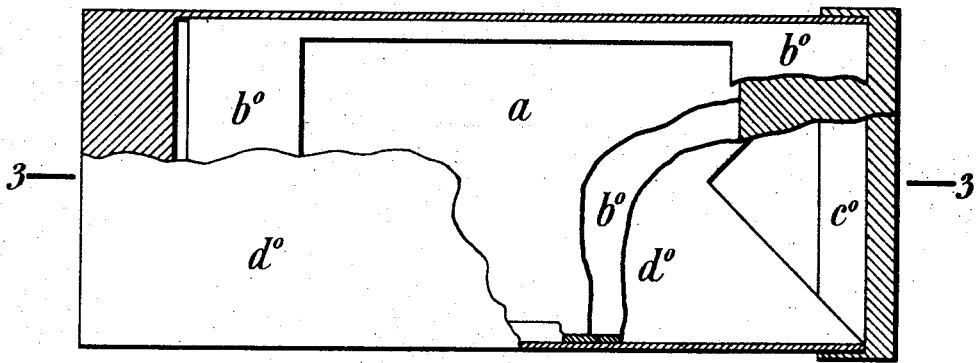

In the accompanying drawing: Figure 1 is a longitudinal section, along the line 1—1 of Fig. 2, through a film holder constructed according to the invention. Fig. 2 is a sectional plan view of the same film holder. Fig. 3 is a longitudinal section through the camera attachment or adapter and (along the line 3—3 in Fig. 4) also through a single film holder admitted into the adapter. Fig. 4 is a sectional plan view of the film holder shown in Fig. 3.

In all examples shown the walls are, for the sake of clearness, exaggerated in thickness. In the double film holder shown in Figs. 1 and 2 two supports $a^1$, $a^2$ of sensitive surfaces are accommodated in a carrier $b$, the main body of the film holder, which is turned back at one end to form the collar $c$. From the opposite end, after housing the supports of the sensitive surfaces, the shutter $d$ has been pushed home over the carrier $b$ and into the collar $c$. To assure the entry of the shutter into the collar, the insertion-piece $e$, whose two tongues are connected together to form an embrasure, has been inserted over the carrier $b$ and into the collar $c$. When the film holder is closed, the insertion piece is withdrawn from it. It is perhaps more suitable, in loading a lot of holders, to use an insertion piece permanently fixed upon a standard and, before closing each film holder with the shutter, to introduce the carrier between the tongues of the insertion piece, until the collar has been slipped over these tongues.

In the single film holder shown in Figs. 3 and 4 the support $a$ of the sensitive surface is accommodated in its carrier $b^0$ so that it is protected against the admission of light from behind. The shutter $d^0$ being therefore discharged from this duty, its back wall is at the free end provided with a deep V-shaped incision whose margins much inclined guide the remaining corners of the shutter back wall with certainty into the collar without having to employ an insertion piece. The insertion piece $e^0$, secured in the adapter, as shown in Fig. 3, and forming a tongue projecting through the entrance slit of the adapter, enters under the front wall of the collar when the carrier $b^0$ is inserted into the adapter $f$. In withdrawing the shutter the insertion piece $e^0$ detains the carrier; in re-inserting the shutter, counter-pressure is applied with the other hand against the end of the collar, thus preventing the film holder being pushed out of the adapter before being completely closed. To withdraw the film holder from the adapter it is first pushed as far as possible in the direction of inserting the shutter, then seized at the collar end and entirely removed.

What I claim as my invention, and desire to secure by Letters Patent, is—

1. A contrivance for facilitating the closing of plate or film holders which have a bag-like shutter and at one end of the plate or film carrier a collar for the reception of the open end of the shutter, consisting of an insertion piece with a thin tongue adapted to enter the collar with its outer surface in contact with the inner surface of the collar and to serve with its inner surface as an outer guide for the introduction of the shutter into the collar.

2. In an adapter for plate or film holders, which have a bag-like shutter and at one end of the plate or film carrier a collar for the reception of the open end of the shutter, the combination with the frame having an exposure aperture and at opposite ends two slits for receiving the holder, of an insertion piece comprising a thin tongue and fitted in one of the slits so as to enter the collar, when the holder is pushed into the adapter, with the said tongue between the inner surface of the collar and the outer surface of the shutter, the tongue being adapted to serve as an outer guide for the re-introduction of the shutter into the collar.

In testimony whereof I have signed my name to this specification in the presence of two subscribing witnesses.

RICHARD SCHÜTTAUF.

Witnesses:
   PAUL KRÜGER,
   FRITZ SANDER.